United States Patent
Sheridan

(10) Patent No.: US 7,174,997 B2
(45) Date of Patent: Feb. 13, 2007

(54) FAILURE TOLERANT PASSIVE LUBRICATION SYSTEM

(75) Inventor: William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 483 days.

(21) Appl. No.: 10/613,233

(22) Filed: Jul. 3, 2003

(65) Prior Publication Data

US 2005/0000753 A1    Jan. 6, 2005

(51) Int. Cl.
F01M 1/00 (2006.01)

(52) U.S. Cl. .................................... 184/6.26; 184/55.1

(58) Field of Classification Search ............... 184/6.16, 184/6.26, 58, 49, 50.1, 55.1; 384/468, 471, 384/473

See application file for complete search history.

(56) References Cited

U.S. PATENT DOCUMENTS

| | | | |
|---|---|---|---|
| 3,666,049 A * | 5/1972 | Kern et al. ..................... | 26/104 |
| 3,779,345 A | 12/1973 | Barnes et al. ................ | 184/6.4 |
| 3,785,461 A * | 1/1974 | Rompa ....................... | 184/55.2 |
| 4,153,141 A | 5/1979 | Methlie ....................... | 184/6.2 |
| 4,284,174 A | 8/1981 | Salvana et al. .............. | 184/6.4 |
| 4,373,421 A | 2/1983 | Camboulives et al. ....... | 184/6.4 |
| 4,390,082 A | 6/1983 | Swearingen ................ | 184/6.4 |
| 4,717,000 A | 1/1988 | Waddington et al. ......... | 184/61 |
| 4,856,273 A | 8/1989 | Murray ..................... | 60/39.08 |
| 4,858,426 A | 8/1989 | Holcomb ................... | 60/39.08 |
| 4,858,427 A * | 8/1989 | Provenzano ............... | 60/39.08 |
| 4,888,947 A | 12/1989 | Thompson ................ | 60/39.08 |
| 4,917,218 A | 4/1990 | Murray ..................... | 184/6.11 |
| 5,018,601 A | 5/1991 | Waddington et al. ........ | 184/6.4 |
| 5,020,636 A | 6/1991 | Daeges | |
| 5,046,306 A | 9/1991 | Borre, Jr. .................. | 60/39.08 |
| 5,097,926 A | 3/1992 | Duello ....................... | 184/6.4 |
| 5,121,815 A | 6/1992 | Francois et al. ............. | 184/6.4 |
| 5,513,722 A * | 5/1996 | Foltz .......................... | 184/55.2 |

(Continued)

FOREIGN PATENT DOCUMENTS

JP    59-20917    5/1984

(Continued)

OTHER PUBLICATIONS

Japanese Office Action translation.

*Primary Examiner*—David Fenstermacher
(74) *Attorney, Agent, or Firm*—Kenneth C. Baran

(57) ABSTRACT

An auxiliary lubrication system for an aircraft turbine engine includes a reservoir 32 of lubricant 50 and a venturi 42 to suction lubricant out of the reservoir and direct an lubricant mist at a bearing 24 or other component requiring lubrication. The venturi is directly connected to a source of motive fluid, such as pressurized air extracted from an engine flowpath 10, and is continuously driven by the motive fluid. The auxiliary system accommodates a failure or malfunction of the primary, high pressure lubrication system. The auxiliary system operates during normal conditions, when the primary system is fully functional. If the primary system fails, the auxiliary system continues to operate for a limited time, until the lubricant in the reservoir is depleted, to provide an lubricant mist to the component being lubricated. The limited-duration lubricant supply allows the aircraft crew time to carry out actions required to safeguard the aircraft and its occupants.

14 Claims, 2 Drawing Sheets

U.S. PATENT DOCUMENTS

| | | | |
|---|---|---|---|
| 5,636,708 A * | 6/1997 | Wedeven et al. | 184/6.22 |
| 6,161,649 A * | 12/2000 | Cotler | 184/6.26 |
| 6,167,318 A | 12/2000 | Kizer et al. | 700/83 |
| 6,463,819 B1 | 10/2002 | Rago | 74/6.2 |
| 2003/0097872 A1 | 5/2003 | Granitz et al. | |
| 2003/0110778 A1 * | 6/2003 | Karafillis et al. | 60/785 |

FOREIGN PATENT DOCUMENTS

| | | |
|---|---|---|
| JP | 2-107896 | 4/1990 |
| JP | 2003-184510 | 7/2003 |

* cited by examiner

FAILURE TOLERANT PASSIVE LUBRICATION SYSTEM

STATEMENT OF GOVERNMENT INTEREST

This invention was made under U.S. Government Contract N00019-02-C-3003. The Government has certain rights in the invention.

TECHNICAL FIELD

This invention relates to lubrication systems and particularly to a lubrication system capable of supplying lubricant for a limited time following a failure or malfunction of a system component.

BACKGROUND OF THE INVENTION

Lubrication systems, such as those used in aircraft gas turbine engines, supply lubricant to bearings, gears and other engine components that require lubrication. The lubricant, typically oil, cools the components and protects them from wear. A typical oil lubrication system includes conventional components such as an oil tank, pump, filter and oil supply conduits.

If one of the lubrication system components fails, malfunctions or sustains damage, the oil supply to the lubricated component may be disrupted resulting in irreparable damage to the component and undesirable corollary consequences. For example, if an engine oil pump fails or a supply conduit develops a severe leak, the resulting loss of oil pressure could disable the engine by causing overheating and/or seizure of the bearings that support the engine rotor. An aircraft engine that becomes disabled in flight is obviously a concern, especially for a single engine military aircraft operating in hostile airspace.

It is known to accommodate the possibility of a failure in the oil system by configuring the system so that it continues to supply oil to the lubricated components for a limited time thereby enabling continued temporary operation of the engine. Such a system allows the aircraft crew time to safely shut down the engine or to take other appropriate actions to safeguard the aircraft and its occupants. In a military aircraft, such a system can provide the crew with valuable additional time to return to friendly airspace.

While it it desirable to employ a lubrication system that accommodates failure of system components, it is also highly desirable that the system be reliable and maintenance free and that it operate passively, i.e. without dedicated sensors, control systems or actuators. In an aircraft application, it is also important that the system be light weight, compact and inexpensive. For combat aircraft, it is also desirable that the system be shielded from potential battle damage.

SUMMARY OF THE INVENTION

It is, therefore, an object of the invention to provide a failure tolerant lubrication system for a gas turbine engine that operates passively to allow continued operation of the engine following failure of one of the system's conventional components and accompanying loss of oil pressure. It is a further object that the system be light weight, compact and inexpensive. It is a further object that the system be maintenance free and that it be shielded from damage.

According to the invention, a lubrication system for a turbine engine includes an auxiliary lubrication circuit featuring a reservoir of reserve lubricant and an aspirator to suction the reserve lubricant out of the reservoir. The aspirator is directly and continuously driven by pressurized fluid during normal operation of the engine so that it functions concurrently with the engine's main lubrication circuit for providing a supply of lubricant to a component requiring lubrication. During abnormal conditions, such as after a malfunction that degrades or disables the engine's main lubrication circuit, the auxiliary circuit continues to operate until the lubricant in the reservoir is depleted. The continued operation of the auxiliary circuit affords the engine operator an interval of time during which the engine can be shut down or other appropriate action can be taken.

The principal advantage of the invention is that it operates passively, i.e. without relying on sensors, valves, control systems or actuators to detect the malfunction and engage the auxiliary circuit. As a result, the system is inexpensive, reliable and substantially maintenance free. Another advantage, especially for aircraft applications, is that the system is light weight and compact. The compactness of the invention allows it to be located deep in the interior of the engine where its vulnerability to battle damage is minimized.

BEST MODE FOR CARRYING OUT THE INVENTION

Figure 1:
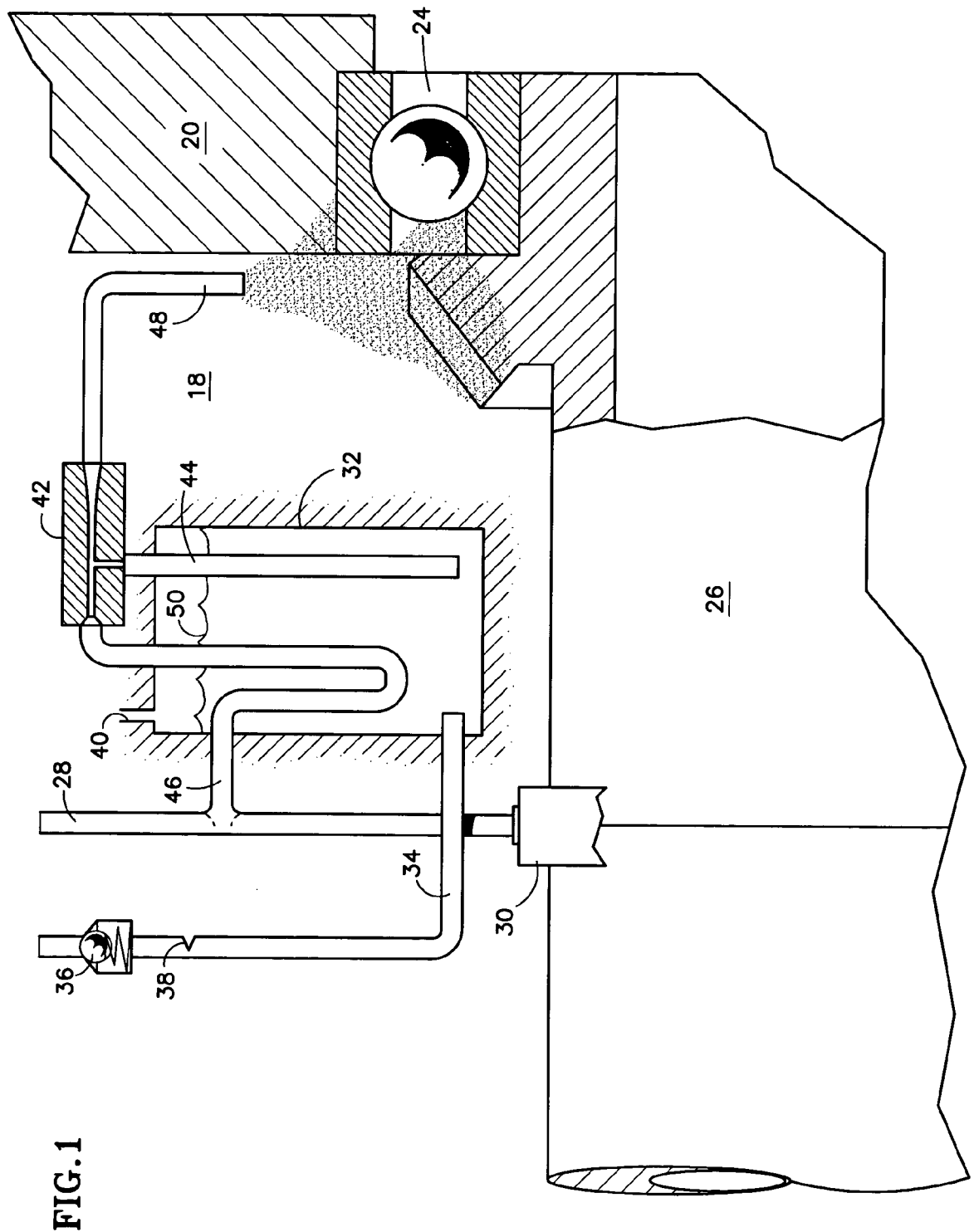
FIG. 1 is a schematic of a lubrication system according to the present invention.
Figure 2:
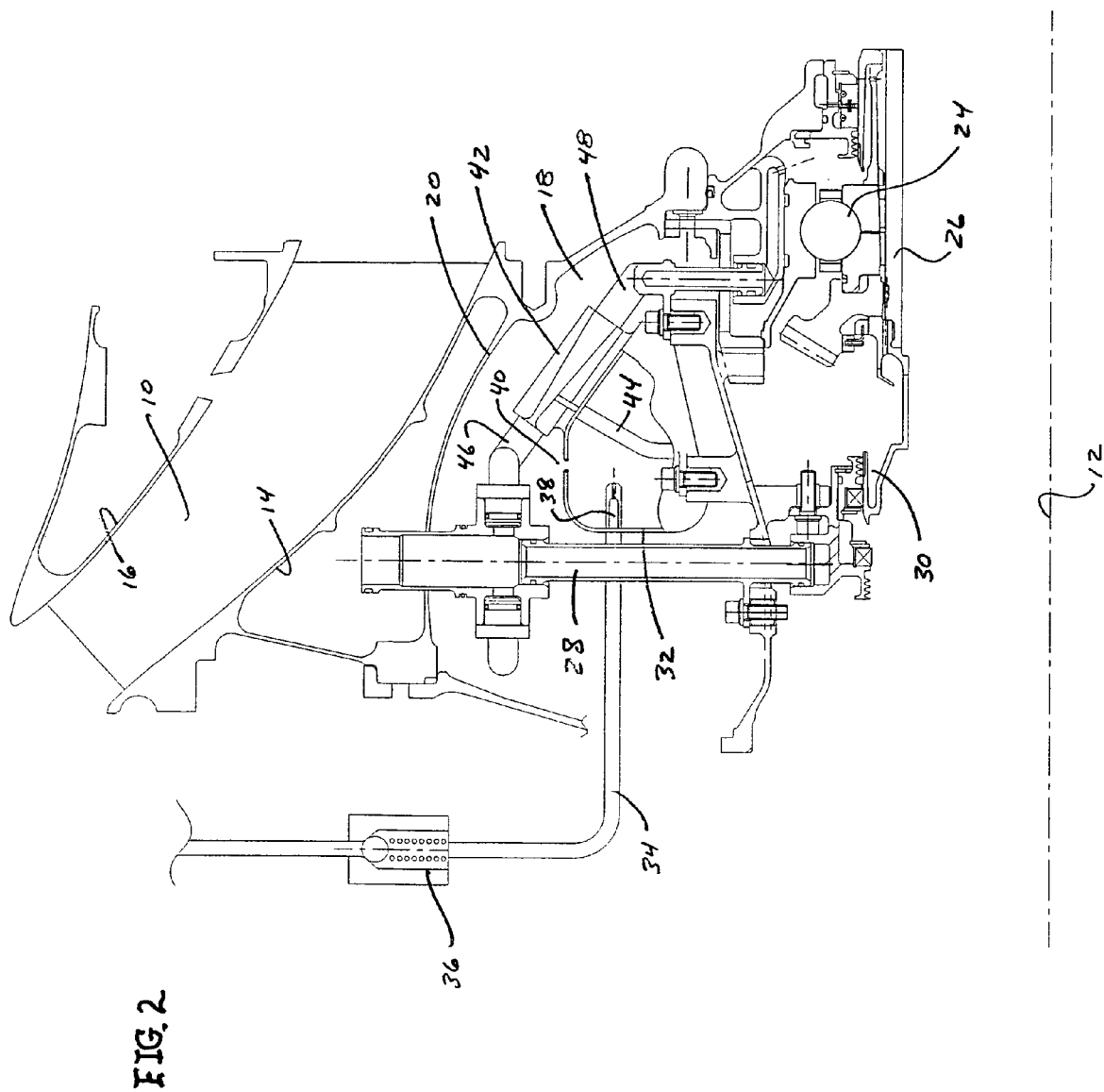
FIG. 2 is a cross sectional side elevation view of a physical embodiment of the lubrication system of FIG. 1.

Referring to FIGS. 1 and 2, a gas turbine engine includes an annular flowpath 10 circumscribing an axially extending centerline or axis 12. Radially inner and outer case walls 14, 16 define radially inner and outer boundaries of the flowpath. A bearing compartment 18 defined by enclosure 20 resides radially inboard of the flowpath. A bearing 24 resides within the compartment and supports an engine rotor or shaft 26. The illustrated portion of the flowpath is a duct extending between low pressure and high pressure compressors, neither of which is illustrated. The duct carries a pressurized working medium fluid, specifically compressed air, from the low pressure compressor to the high pressure compressor.

A buffer air supply tube 28 extends radially inwardly from just inboard of case wall 14 to a location proximate a seal 30 at the front of the bearing compartment. During engine operation, a small amount of compressed air from the flowpath enters the supply tube 28 by way of openings, not shown, in the case wall 14. The compressed air is at a pressure slightly higher than the prevailing pressure inside the bearing compartment. The tube delivers the air to the seal 30 thus buffering the compartment, i.e. helping to resist lubricant leakage out of the bearing compartment.

A lubricant reservoir 32 having a vent hole 40 is mounted inside the bearing compartment. As depicted in FIG. 2, the wall of the reservoir is partly broken away to expose the interior of the reservoir. A lubricant supply line 34 penetrates into the reservoir. The supply line includes a check valve 36 and a restrictor 38.

An aspirator, such as venturi 42, is mounted inside the bearing compartment. A pick-up tube 44 extends from the venturi and penetrates into the reservoir. The bottom of the pick-up tube, visible in FIG. 1, is open so that the venturi communicates with lubricant in the reservoir. A branch 46 of the buffer air supply tube extends to an intake port on the venturi, thus connecting the intake port directly to a source of pressurized air. As seen in the schematic illustration of FIG. 1, the branch of the supply tube may cross through the reservoir. An outlet tube 48 extends from an outlet port on the venturi to a location proximate the bearing 24.

During a normal mode of engine operation, a main lubrication circuit, not shown, provides one or more high pressure streams or jets of lubricant to the bearing. The pressure of the lubricant in the main circuit opens check valve 36 so that a small fraction of the main lubricant supply also flows through supply line 34 and discharges into the reservoir to establish a reserve quantity of lubricant 50 therein. The vent hole 40 allows air to escape from the reservoir in response to the accumulation of lubricant. The reserve quantity need be established only on a new or recently serviced engine because, as the reader will soon appreciate, the reserve quantity remains confined in the reservoir, although it is continuously extracted and replenished during normal engine operation. The restrictor 36 meters the quantity of lubricant flowing through line 34 and also introduces a pressure loss for reasons explained hereinafter.

Concurrently, a portion of the buffer air in supply tube 28 flows through the venturi 42 where it serves as a motive fluid for powering the venturi. The pressurized air flowing through the venturi acts as a power source to suction reserve lubricant out of the reservoir, atomize the lubricant into a fine mist, and propel the mist through the outlet tube 48. The mist discharges from the end of tube 48 proximate the bearing 24. This lubricant mist is in addition to the lubricant stream delivered by the main lubrication circuit. The lubricant mist is not necessary during normal operation because the lubricant stream provided by the main circuit is sufficient to lubricate and cool the bearing. Rather, the lubricant mist is a byproduct of the auxiliary circuit.

In the event that a malfunction or failure in the main lubricant circuit disrupts the main lubricant stream supplying the bearing, the attendant loss of lubricant pressure causes closure of the check valve 36 to prevent the reserve lubricant from being siphoned out of the reservoir through supply line 34. However, because the engine is still operating, pressurized buffer air continues to flow through the venturi to suction reserve lubricant out of the reservoir and propel a lubricant mist to the bearing. As a result, the operation of the engine is sustained, albeit in an abnormal operating mode. The sustained operation of the engine ensures uninterrupted flow of pressurized air to power the venturi so that the engine can continue to be supplied with a lubricant mist and operate in the abnormal mode. Because the lubricant flow rate of the mist is much smaller than that of the lubricant stream normally provided by the main lubrication circuit, the bearing will likely experience highly accelerated wear and require replacement. Nevertheless, the lubricant mist is adequate to keep the engine operating safely until the lubricant reserve in the reservoir is depleted. In one application for the invention, a reserve of about one-liter of lubricant can support about fifteen minutes of mist lubrication. The aircraft crew can take advantage of these additional minutes of operation to systematically follow the procedures necessary to safeguard the aircraft and its occupants and to safely shut the engine down before the rotor seizes or overheats. If the engine powers a military aircraft operating in hostile airspace, the crew can use the interval of extended operation to proceed toward friendly airspace.

In view of the foregoing, certain additional features and many advantages of the invention can now be appreciated. The lubricant supply line 34 can cross through the reserve lubricant 50 in the reservoir as shown in FIG. 1. The reserve lubricant then serves as a heat sink to lower the temperature of the hot, pressurized buffer air before that air enters the venturi. Cooler air may be beneficial because the fine lubricant droplets created in the venturi will acquire heat readily from the buffer air. This heat transfer promotes the formation of coke, which is an undesirable hydrocarbon deposit, in the venturi 42 and outlet tube 48 during the normal mode of operation. The reserve lubricant in the reservoir is not similarly affected because its greater bulk resists rapid heat transfer. The cooler air also guards against ignition of the lubricant.

The vent hole 40, in addition to allowing air to escape during filling of the reservoir, also allows air to enter the reservoir as lubricant is being extracted during the abnormal mode of operation. This prevents the establishment of a vacuum in the reservoir that could open the check valve 36.

The restrictor 38 in the supply line 34 not only meters the lubricant flow into the reservoir, but also introduces a pressure loss. If the restrictor were absent, the high pressure of the main lubricant circuit would urge lubricant through the reservoir 32, the venturi 42 and the outlet tube 48 at a high rate during normal operation, with the result that an adequate reserve of lubricant might not accumulate in the reservoir. By contrast, the lower reservoir pressure resulting from the presence of the restrictor ensures that lubricant outflow from the reservoir is governed by the action of the venturi, which extracts lubricant at a more modest rate, thus promoting the establishment of the reserve and ensuring its continued presence.

The pressurized buffer air flows exclusively through the venturi rather than entering the reservoir to pressurize the lubricant therein. The absence of high pressure in the reservoir, which results from this absence of pressurized air in the reservoir and also from the restrictor 38 in the lubricant supply line, minimizes structural demands on the reservoir. As a result, the reservoir is light weight and compact, both of which are significant advantages in aircraft applications. The absence of high pressure acting on the reserve lubricant also conserves lubricant during operation in the abnormal mode.

The compact, light weight character of the reservoir allows it to reside radially inboard of the engine flowpath 10. Such location is advantageous in a military aircraft because it shields the reservoir from battle damage. Indeed, the reservoir 32, venturi 42 and outlet tube 48 are compact enought to fit within the bearing compartment 18, where they are afforded even more protection from damage.

As already pointed out, the venturi is connected directly to a source of pressurized motive fluid, specifically compressed air extracted from the flowpath 10 by way of openings in radially inner flowpath wall 14. The connection is referred to as a direct connection because the air flows from the flowpath to the venturi without interruption or without being diverted to other uses prior to entering the venturi. As a result, the useful properties of the pressurized air entering the venturi are unimpaired. For example, because the air suffers no appreciable pressure loss, as might occur if the air had been used for some other purpose prior to entering the venturi, the source air can be of relatively low pressure. This is an advantage because the extraction of low pressure air causes a smaller loss of engine efficiency than does the extraction of higher pressure air. In addition, this low pressure air is relatively low in temperature so that it requires no cooling (FIG. 2) or requires no more cooling than can be accomplished by using the reserve oil as a heat sink (FIG. 1). Moreover, air extracted from the radially innermost extremity of the flowpath is substantially free of dirt and other particulate contaminants because the action of the low pressure compressor tends to centrifuge such contaminants radially outwardly, away from the inner wall 14. Because of the direct path to the venturi, this clean air is likely to remain clean rather than picking up contaminants that might be harmful to the bearing 24 or to components of the lubrication system.

The system operates without any dedicated valves, actuators or controllers. In particular, the buffer air supply tube 28 passively communicates with both the source of pressurized motive fluid (i.e. with the flowpath 10) and with the venturi 42 during both the normal and abnormal modes of operation. Therefore, the system is highly reliable and maintenance free. In addition, because lubricant continually flows into and out of the reservoir during the normal mode of operation, the reserve lubricant is continually refreshed. As a result, the reserve lubricant resists age related degradation that might afflict a stagnant stockpile of reserve lubricant.

During the normal mode of operation, the auxiliary circuit operates concurrently with the main lubrication circuit. The main circuit provides a normal quantity of lubricant to the bearing in the form of a high pressure stream or jet. The reservoir of the auxiliary circuit concurrently receives a fractional quantity of lubricant. The venturi suctions reserve lubricant from the reservoir and delivers an auxiliary quantity of lubricant to the bearing in the form of a mist. In combination, the normal quantity of lubricant provided by the main circuit and the auxiliary quantity provided by the auxiliary circuit represent a normal aggregate quantity of lubricant delivered to the bearing.

In the abnormal mode of operation, the main circuit's capability for providing lubricant has become either degraded or, in the limit, completely disabled. Either way, the main circuit delivers a diminished quantity of lubricant to the bearing and provides a diminished fractional quantity of lubricant to the reservoir. In the case of a degraded system, the diminished quantity and the diminished fractional quantities are finite amounts. In the case of a disabled system, the diminished quantity and diminished fractional quantities are zero or essentially zero. However the venturi continues to suction reserve lubricant from the reservoir and delivers the auxiliary quantity of lubricant to the bearing in the form of a mist. In combination, the diminished quantity of lubricant provided by the main circuit and the auxiliary amount provided by the auxiliary circuit represent a diminished aggregate quantity of lubricant delivered to the bearing. If the main lubrication circuit is degraded, there may be sufficient lubricant pressure to hold check valve 36 at least partially open thereby replenishing at least some of the reserve lubricant in the reservoir 32. If the main lubrication circuit is completely disabled, the valve 36 closes, however the venturi continues to provde an auxiliary lubricant mist for a limited time, until the reserve lubricant is depleted from the reservoir.

Although this invention has been shown and described with reference to a detailed embodiment thereof, it will be understood by those skilled in the art that various changes in form and detail may be made without departing from the invention as set forth in the accompanying claims.

I claim:

1. A lubrication system for a component requiring lubrication during normal and abnormal operating modes, comprising:
    a reservoir for receiving lubricant during the normal operating mode and for confining a reserve quantity of the lubricant; and
    an aspirator communicating with the reserve quantity, the aspirator being directly and continuously driven by a pressurized fluid during both modes of operation.

2. The lubrication system of claim 1 wherein the pressurized fluid is a working medium fluid extracted from a fluid flowpath of a turbine engine.

3. The lubrication system of claim 2 wherein the pressurized fluid is bearing compartment buffering air.

4. The lubrication system of claim 2 wherein the reservoir and aspirator reside radially inboard of the flowpath.

5. The lubrication system of claim 4 wherein the reservoir and aspirator reside within a bearing compartment.

6. The lubrication system of claim 1 including a supply tube for conveying the pressurized fluid to the aspirator, the supply tube crossing through the reserve quantity of lubricant.

7. The lubrication system of claim 1 wherein the aspirator is a venturi.

8. The lubrication system of claim 1 wherein the aspirator discharges a mist of lubricant.

9. The lubrication system of claim 1 including a lubricant supply line extending to the reservoir, the supply line including a check valve and a restrictor.

10. The lubrication system of claim 1 wherein the component requiring lubrication receives a normal aggregate quantity of lubricant during operation in the normal mode and a diminished quantity of lubricant, less than the normal aggregate quantity, during operation in the abnormal mode.

11. The lubrication system of claim 1 wherein the component requiring lubrication is a bearing.

12. A failure tolerant lubrication system, comprising:
    a reservoir that receives a fractional quantity of lubricant during a normal mode of operation and a diminished fractional quantity of lubricant during an abnormal mode of operation and that confines a reserve quantity of lubricant;
    a lubricant supply line connected to a main lubricant supply for supplying the fractional and diminished fractional quantities of lubricant to the reservoir;
    a venturi communicating with the reserve quantity of lubricant; and
    a fluid supply tube permanently connected to a source of pressurized motive fluid and to the venturi for directly powering the venturi during both modes of operation.

13. A method for lubricating a component requiring lubrication, comprising:
    supplying a primary stream of lubricant to the component;
    concurrently supplying a secondary mist of lubricant to the component, the secondary mist being directly powered by a power source; and
    upon disruption of the primary stream, continuing to provide the secondary mist for at least a limited time under the direct influence of the same power source.

14. A method of claim 13 wherein the power source is pressurized air acting through a venturi.

* * * * *